A. CITROEN.
HYDRAULIC POWER TRANSMISSION DEVICE.
APPLICATION FILED FEB. 3, 1913.
1,080,000.
Patented Dec. 2, 1913.
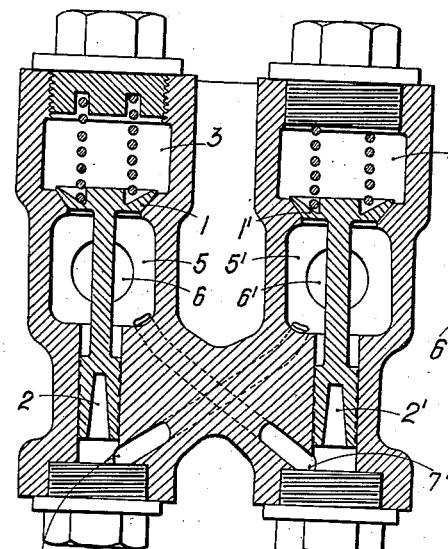
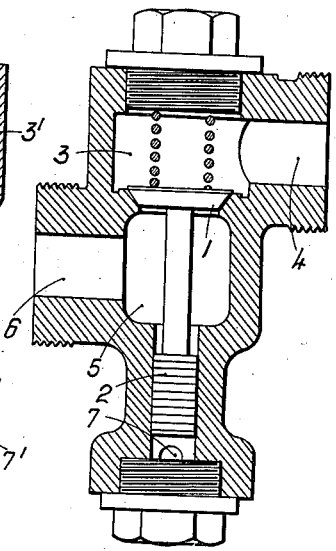
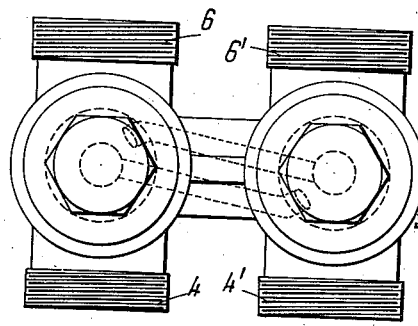
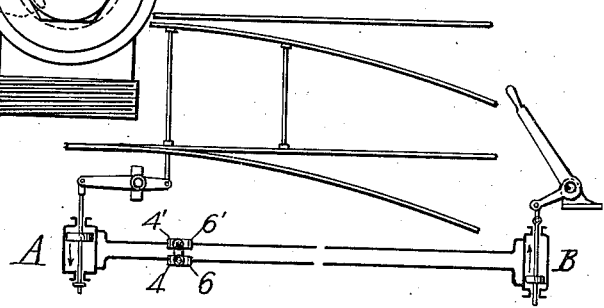

UNITED STATES PATENT OFFICE.

ANDRÉ CITROEN, OF PARIS, FRANCE.

HYDRAULIC POWER-TRANSMISSION DEVICE.

1,080,000. Specification of Letters Patent. Patented Dec. 2, 1913.

Application filed February 3, 1913. Serial No. 745,922.

*To all whom it may concern:*

Be it known that I, ANDRÉ CITROEN, citizen of the French Republic, residing at Paris, Department of the Seine, in France, have invented certain new and useful Improvements in and Relating to Hydraulic Power-Transmission Devices; and I do hereby declare the following to be a full, clear, and exact description of the invention, such as will enable others skilled in the art to which it appertains to make and use the same.

Apparatus for transmission of movement to a distance acting by means of a fluid under pressure consists of a transmission or control member and a receiving or controlled member which are generally identical in construction, the former displaces a fluid and sends it to the latter through piping, the fluid acting in this receiver so as to reproduce a mechanical movement bearing a definite relationship to that by which the transmission apparatus was actuated; then, through a second system of piping, the fluid returns without pressure to the transmitting apparatus, in such a manner that the same fluid, without any loss, serves indefinitely for the transmission. By reversing the direction of the movement of the first apparatus, the direction of the circulation of the fluid is reversed and also the direction of displacement of the second apparatus. Naturally, apparatus constructed to obtain such results should not comprise any dead points in their movement. It will readily be understood that, in these conditions, these apparatus are not irreversible of themselves and that any external action upon the movement of the controlled apparatus makes itself felt on the controlling apparatus. It is possible to add a purely mechanical device of any known kind for obtaining irreversibility while at rest to the mechanical control of the transmitting member or to that of the receiving member, but apart from the fact that it is not always possible to apply these known devices to the controlled apparatus owing to special circumstances, the application of these devices to the transmitting apparatus presents the inconvenience of shifting to a distance the point at which the controlled apparatus is blocked and also of interposing quite a number of members in addition to the fluid itself; there is therefore a tendency for these devices to be retarded in their action and to produce considerable hesitation or wavering, they are also liable to act inopportunely if the slightest hydraulic recoil should occur.

The object of the present invention is to obtain irreversibility while the transmitting and controlled members or driving and driven elements are at rest by means of a device acting upon the fluid itself, in such manner as to block it when the controlled apparatus tends to displace the transmitting apparatus, it is constituted by a kind of double valve.

In the accompanying drawing: Figure 1 is an axial section of the two valves. Fig. 2 is a section at right angles to the foregoing through the axis of one of the two valves, the individual arrangement of which is repeated in each. Fig. 3 is a plan. Fig. 4 is a diagrammatic view showing the valve mechanism applied to the driving and driven elements of a railway switch operating mechanism. In the drawing, the valve mechanism is shown applied to the driving and driven elements of a railway switch operating mechanism, but it will be understood that it may be used in combination with any driving and driven elements of this same general type.

The device for obtaining irreversibility consists of two valves 1—1' the stems of which form pistons 2—2'. The upper chambers 3—3' of the valve bodies communicate respectively with the controlled apparatus A, (Fig. 4,) by means of tubes with connections 4—4'. The lower chambers 5—5' communicate in the same conditions with the transmitting apparatus B through the connections 6—6'. The pistons 2—2' which are integrally connected with the valves move in cylinders the upper part of which opens into the respective chambers 5—5' while their lower parts, beneath the pistons 2—2' communicate through appropriately formed passages 7—7' with the chamber 5' and the chamber 5 respectively. The valves are held upon their seats by means of springs.

The operation of the apparatus is as follows: When the control apparatus B is inoperative the two valves being applied to their seats, it is not possible for the controlled apparatus A, under the influence of an external force, to move in either direction, because such a movement could only be transformed into a circulation of the fluid, which is unable to find an issue toward the transmitting apparatus. Irreversibility of the apparatus while at rest is thus insured in an exceedingly simple manner. Now when the transmitting apparatus is rendered operative, it is essential that transmission to the controlled apparatus should be possible. With this object assuming for example that the transmitting apparatus is started for a given direction of movement it follows that the fluid is placed under pressure on one side in the chamber 5 for example, while it is not under pressure in the chamber 5'. The effect of this pressure is: (1) to lift the valve 1 from its seat, thereby enabling the fluid to continue its travel in the canalization toward the controlled apparatus. (2) to lift the valve 1' also, because the chamber 5 communicates with 7' and no pressure prevails either in 3' (apart from the effect of the spring and that of the weight of the valve) no obstacle to this lifting is opposed. Accordingly, as the valve 1' is lifted, the return of the fluid under pressure, and consequently the transmission are possible. If movement in the opposite direction be desired the pressure will be established in 5' and in 7 and will not prevail in 5 and 3 and the two valves will also be lifted, the valve 1' directly and the valve 1 by the action of the piston 2. As soon as the pressure ceases to exist in the chambers 5 and 5' and consequently in 7 and 7', the two valves fall back upon their seats under the influence of the springs.

I claim:

1. The combination with a hydraulic power transmission mechanism comprising driving and driven elements, of means to prevent the driven element from actuating the driving element, said means comprising valve casings, valves located therein, each casing being in communication with the driving element on one side of the valve and with the driven element on the other side of the valve, said valves adapted to open in the direction of flow of the fluid from the driving element, and means associated with said casings whereby when one of the valves is opened by the pressure of the fluid from the driving element the other valve will be opened to permit the fluid to return to the driving element.

2. The combination with a hydraulic power transmission mechanism comprising driving and driven elements, of means to prevent the driven element from actuating the driving element, said means comprising valve casings, valves located therein, each casing being in communication with the driving element on one side of the valve and with the driven element on the other side of the valve, said valves adapted to open in the direction of flow of the fluid from the driving element, pistons on said valves, said casings provided with openings in which said pistons are guided, and means to permit a portion of the fluid from the driving element to act on the piston of one of said valves to open the same.

3. The combination with a hydraulic power transmission mechanism comprising driving and driven elements, of means to prevent the driven element from actuating the driving element, said means comprising valve casings, valves located therein, each casing being in communication with the driving element on one side of the valve and with the driven element on the other side of the valve, said valves adapted to open in the direction of flow of the fluid from the driving element, a piston on one of said valves, the casing provided with an opening in which said piston is guided, and means to permit a portion of the fluid from the driving element to act on said piston and thereby open its valve.

4. The combination with a hydraulic power transmission mechanism comprising driving and driven elements, and supply and return conduits connecting said elements, of valves located in said conduits, said valves adapted to be opened by the pressure of the fluid from the driving element, but not by that from the driven element when the latter is used as a driving element, and means whereby when the valve in the supply conduit is opened the valve in the return conduit will also be opened.

In testimony whereof I affix my signature, in presence of two witnesses.

ANDRÉ CITROEN.

Witnesses:
 HANSON C. COXE,
 EMILE KLOTZ.